(12) United States Patent
Mueck

(10) Patent No.: US 11,031,967 B2
(45) Date of Patent: Jun. 8, 2021

(54) TRANSMISSION MANAGEMENT TECHNIQUES FOR AVOIDING EXCESSIVE EXPOSURE OF HUMANS TO ELECTROMAGNETIC ENERGY

(71) Applicant: Intel Corporation, Santa Clara, CA (US)

(72) Inventor: Markus Dominik Mueck, Unterhaching (DE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/741,880

(22) Filed: Jan. 14, 2020

(65) Prior Publication Data
US 2020/0259515 A1 Aug. 13, 2020

(30) Foreign Application Priority Data

Feb. 13, 2019 (EP) .................................... 19156854

(51) Int. Cl.
*H04B 1/3827* (2015.01)
*H04W 52/36* (2009.01)
*H04W 4/029* (2018.01)

(52) U.S. Cl.
CPC .......... *H04B 1/3838* (2013.01); *H04W 4/029* (2018.02); *H04W 52/367* (2013.01)

(58) Field of Classification Search
CPC .. H04L 5/0044; H04L 5/0048; H04W 52/143; H04W 52/32
USPC ......... 455/69, 77, 127.2, 522; 370/312, 329; 342/374
See application file for complete search history.

(56) References Cited

U.S. PATENT DOCUMENTS

| 6,456,856 | B1  |   | 9/2002  | Werling et al. |                    |
|-----------|-----|---|---------|----------------|--------------------|
| 10,630,309| B1  | * | 4/2020  | Fan            | H03M 1/46          |
| 2005/0058089 | A1 | * | 3/2005 | Vijayan        | H04L 5/0044 370/312 |
| 2006/0017602 | A1 | * | 1/2006 | Puma           | H03M 1/187 341/164 |
| 2007/0129031 | A1 | * | 6/2007 | Newton         | H04B 1/40 455/127.2 |
| 2012/0062424 | A1 | * | 3/2012 | Hwang          | H04B 7/0602 342/374 |
| 2013/0217342 | A1 | * | 8/2013 | Abdul-Gaffoor  | H01Q 1/52 455/77 |
| 2013/0318444 | A1 | * | 11/2013 | Imes          | G06F 3/0484 715/733 |
| 2015/0099558 | A1 | * | 4/2015 | Zehr           | H04B 1/3838 455/522 |

(Continued)

OTHER PUBLICATIONS

European Patent Office, European Search Report issued for EP 19156854.2, 8 pgs., dated Jul. 15, 2019.

*Primary Examiner* — Tan H Trinh
(74) *Attorney, Agent, or Firm* — Schiff Hardin LLP

(57) ABSTRACT

The disclosure relates to a power control circuitry for controlling a radio frequency, RF, transmitter of a network equipment or a user equipment, the power control circuitry comprising: a controller configured to control a power level of an RF signal generated by the RF transmitter for transmission via an antenna arrangement, wherein the power level is controlled based on information about an object within an coverage area of the antenna arrangement.

23 Claims, 10 Drawing Sheets

(56) References Cited

U.S. PATENT DOCUMENTS

| | | | |
|---|---|---|---|
| 2016/0174140 A1* | 6/2016 | Wu | H04L 63/0876 370/329 |
| 2016/0365886 A1* | 12/2016 | Prendergast | H04W 52/367 |
| 2017/0244441 A1* | 8/2017 | Cavaliere | H04L 25/028 |
| 2017/0257155 A1* | 9/2017 | Liang | H04B 7/15507 |
| 2018/0160377 A1* | 6/2018 | Abramsky | H04W 52/283 |
| 2018/0227804 A1* | 8/2018 | Damnjanovic | H04W 28/26 |
| 2020/0169298 A1* | 5/2020 | Smirnov | G06K 7/10316 |
| 2020/0203853 A1* | 6/2020 | Hu | H01Q 21/28 |

* cited by examiner

TRANSMISSION MANAGEMENT TECHNIQUES FOR AVOIDING EXCESSIVE EXPOSURE OF HUMANS TO ELECTROMAGNETIC ENERGY

FIELD

The disclosure relates to techniques for managing radio transmissions with the objective to avoid excessive exposure of humans to electromagnetic energy and/or to avoid the absorption of electromagnetic energy. The disclosure relates to radio communication systems, in particular millimeter wave radio transmission systems. The disclosure particularly relates to mmWave spatial multiplexing for meeting Specific Absorption Rate (SAR) requirements. The disclosure further relates to circuits and devices for controlling a power level of a radio frequency (RF) transmitter of a network equipment or a user equipment and to methods for controlling a power level of an RF signal transmitted by an RF transmitter.

BACKGROUND

A millimeter wave radio transmission system 100 as shown in FIG. 1 includes a millimeter wave transmitter 101 generating a mm wave signal and an antenna 102, e.g. antenna array, for radiating the mm wave signal. A user 110 or in general an object may be exposed to radiation power of the system. The numbers shown in FIG. 1, such as 30 dBm power, antenna gain of 25 . . . 30 dBi, EIRP of 55 . . . 60 dBm are typical examples, actual systems may differ quite a bit. The disclosure isn't limited to the parameter range indicated here in FIG. 1 and the other Figures. The mmWave transmitter 101 may generate approximately 30 dBm of power and a highly directional antenna 102 may provide an antenna gain of approximately 25 to 30 dBi. The total radiated power is thus approximately 55 to 60 dBm EIRP. In such mm wave radio transmission system 100 there is a need to protect the User 110 against potentially harmful exposure levels to electromagnetic energy. The Specific Absorption Rate (SAR) is a measure of the rate at which energy is absorbed by the human body when exposed to a radio frequency (RF) electromagnetic field.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
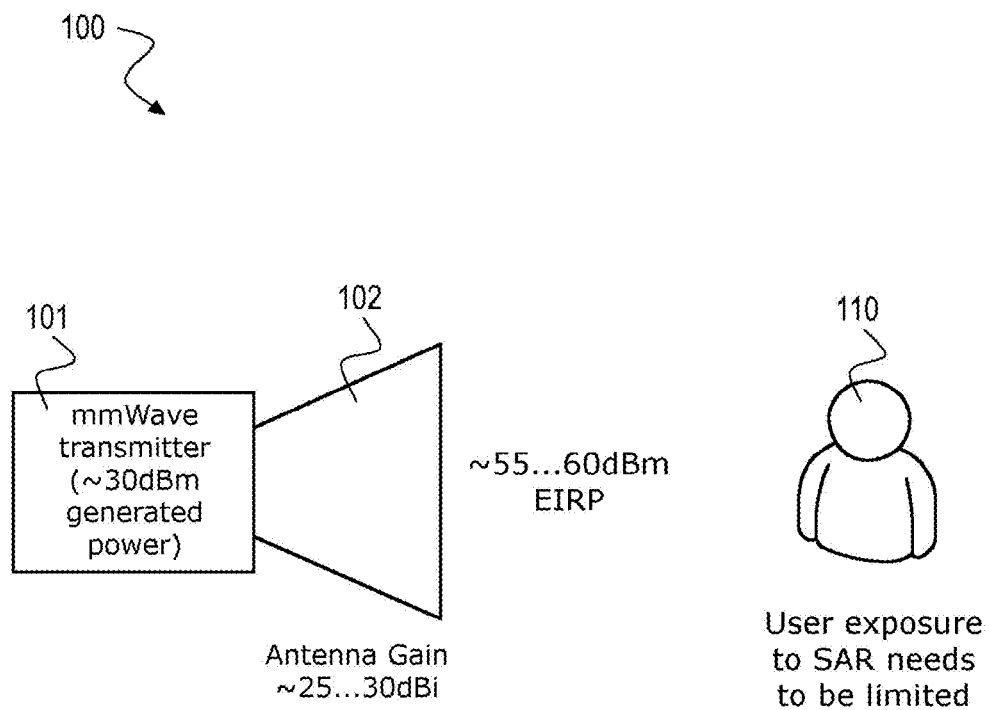
FIG. 1 is a schematic diagram of an exemplary millimeter wave radio transmission system 100 with a millimeter wave transmitter 101 and a user (or object) 110 exposed to radiation power of the transmitter.

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein:
SAR: Specific Absorption Rate
5G: 3GPP fifth generation specifications
mmWave: millimeter Wave
UE: User Equipment
BS: Base Station
AP: Access Point
LTE: Long Term Evolution
RF: Radio Frequency
UL: uplink
DL: downlink EIRP: Effective Isotropic Radiated Power
OFDM: Orthogonal Frequency Division Multiplex
MCS: Modulation and Coding Scheme
QAM: Quadrature Amplitude Modulation
BPSK: Binary Phase Shift Keying It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The techniques described herein may be implemented in wireless communication networks, in particular communication networks based on mobile communication standards such as 5G new radio (NR), in particular for millimeter-wave data rate. The techniques may also be applied in LTE networks, in particular LTE-A and/or OFDM and successor standards. The methods are also applicable for high speed communication standards from the 802.11 family according to the WiFi alliance, e.g. 802.11ad and successor standards. The methods and devices described below may be implemented in electronic devices such as cellular handsets and mobile or wireless devices or User Equipment communicating with radio cells such as access points, base stations, gNodeBs and/or eNodeBs. The described devices may include integrated circuits (ICs) and/or passives and may be manufactured according to various technologies. For example, the circuits may be designed as logic integrated circuits, ASICs, analog integrated circuits, mixed signal integrated circuits, optical circuits, memory circuits and/or integrated passives.

In the following, radio frequency (RF) signals are used for transmission. Radio frequency (RF) refers to an oscillation rate of an alternating electric current or voltage or of a magnetic, electric or electromagnetic field or mechanical system. Such RF signals may be applied in kHz systems, MHz systems, GHz systems and THz systems that are currently under investigation. These are the frequencies at which energy from an oscillating current can radiate off a conductor into space as radio waves. Different sources specify different upper and lower bounds for the frequency range.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth(®), Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz) etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.] Some of the features in this document are defined for the network side, such as Access Points, eNodeBs, New Radio (NR) or next generation Node Bs (gNodeB or gNB—note that this term is typically used in the context of 3GPP fifth generation (5G) communication systems), etc. Still, a User Equipment (UE) may take this role as well and act as an Access Points, eNodeBs, gNodeBs, etc. I.e., some or all features defined for network equipment may be implemented by a UE.

In the following description, the terms ERP and EIRP are used to determine radiation of antennas. Effective radiated power (ERP), synonymous with equivalent radiated power, is an IEEE standardized definition of directional RF power, such as that emitted by a radio transmitter. It is the total power in watts that would have to be radiated by a half-wave dipole antenna to give the same radiation intensity (signal strength in watts per square meter) as the actual source at a distant receiver located in the direction of the antenna's strongest beam (main lobe). ERP measures the combination of the power emitted by the transmitter and the ability of the antenna to direct that power in a given direction. It is equal to the input power to the antenna multiplied by the gain of the antenna. It is used in electronics and telecommunications, particularly in broadcasting to quantify the apparent power of a broadcasting station experienced by listeners in its reception area.

An alternate parameter that measures the same thing is effective (or equivalent) isotropic radiated power (EIRP). Effective isotropic radiated power is the total power that would have to be radiated by a hypothetical isotropic antenna to give the same signal strength as the actual source in the direction of the antenna's strongest beam. The difference between EIRP and ERP is that ERP compares the actual antenna to a half-wave dipole antenna, while EIRP compares it to a theoretical isotropic antenna.

FIG. 1 is a schematic diagram of an exemplary millimeter wave radio transmission system 100 with a millimeter wave transmitter 101 and a user (or object) 110 exposed to radiation power of the transmitter.

The millimeter wave radio transmission system 100 includes a millimeter wave transmitter 101 generating a mm wave signal and an antenna 102, e.g. antenna array or antenna arrangement, for radiating the mm wave signal. A user 110, e.g. a human body, or in general an object may be exposed to radiation power of the system. The mmWave transmitter 101 may generate approximately 30 dBm of power and a highly directional antenna 102 may provide an antenna gain of approximately 25 to 30 dBi. The total radiated power is thus approximately 55 to 60 dBm EIRP. In such mm wave radio transmission system 100 there is a need to protect the User 110 against potentially harmful exposure levels to electromagnetic energy.

The Specific Absorption Rate (SAR) is a measure of the rate at which energy is absorbed by the human body 110 when exposed to a radio frequency (RF) electromagnetic field. It can also refer to absorption of other forms of energy by tissue, e.g. ultrasound etc. It is defined as the power absorbed per mass of tissue and has units of watts per kilogram (W/kg). SAR is usually averaged either over the whole body, or over a small sample volume (typically 1 g or 10 g of tissue). The value cited is then the maximum level measured in the body part studied over the stated volume or mass. The FCC regulations for SAR are contained in 47 C.F.R. 1.1307(b), 1.1310, 2.1091, 2.1093.

5G mmWave equipment is operating typically in bands between 20 GHz and 77 GHz, including the typical case of operation in 28 GHz. Typical implementations apply output power levels of about 30 dBm in combination with high gain antennas of typically about 25 to 30 dBi antenna gain. The resulting power levels are thus in the order of magnitude of about 55 to 60 dBm EIRP (effective or equivalent isotropic radiated power). Moreover, current equipment is deployed at low height, approximately 2-3 m. It is currently unclear whether regulation authorities will restrict such emissions due to the potential SAR related impact.

It is indeed expected that regulation authorities may implement a limitation of some kind in order to reduce the absorption by the human body. Such limitation may comprise for example the following:

"long time" average energy limitation: The integral of the emitted energy over a given Time Interval $T_I$ must be low a predetermined level $E_{max}$. In the "long term" case, the observation interval is considerably larger than the duration of a packet or frame: $T_I >> T_{Frame}$;

"short time" average energy limitation: The integral of the emitted energy over a given Time Interval $T_I$ must be low a predetermined level $E_{max}$. In the "short term" case, the observation interval is in the order to magnitude of the duration of a packet or frame (or smaller): $T_I << T_{Frame}$;

"instantaneous" power level limitation: At any point in time, the emitted power must be below a certain threshold $P_{max}$.

Corresponding discussions are just starting with the relevant regulation administrations. Although some early deployment may be authorized, corresponding discussions are likely going to come up as 5G mmWave equipment is being deployed more broadly.

The disclosure presents a concept and implementation to manage radio transmissions, in particular mmWave 5G transmissions, in order to keep exposure levels to electromagnetic energy below a given threshold.

In a first approach, transmissions are being scheduled such that different APs/BS/UE (Access Points/Base Stations/User Equipment) are transmitting at different instances of time (or for consecutive transmissions) in order to spatially distribute the emitted power. Such spatial distribution of transmission allows to reduce exposure levels of user to electromagnetic energy in proximity to transmit antennas. The approach is to use multiple transmit stations instead of a single one in order to serve one or multiple users. Those multiple stations can be used by applying one of different options as described below with respect to FIGS. 2 to 4.

In a second approach, transmissions are being allocated to distinct APs/BS depending on the user location. High throughput transmissions are scheduled on near-by APs/BS, lower throughput/lower priority transmissions are scheduled on further-away APs/BSs. This way a spatial distribution of the emitted power is achieved. Such transmission concept is described below with respect to FIG. 4.

In a third approach, power is reduced in combination with low-efficiency/low-power-requirement MCS mode. Such transmission concept is described below with respect to FIG. 5.

A central controller 601 as described below with respect to FIG. 6 can be used for controlling the various transmitter devices. Alternatively, the transmitter devices may apply a distributed control concept.

Implementations presented hereinafter allow to meet SAR requirements while fulfilling user requirements in terms of throughput, latency, quality, etc.

Figure 2:
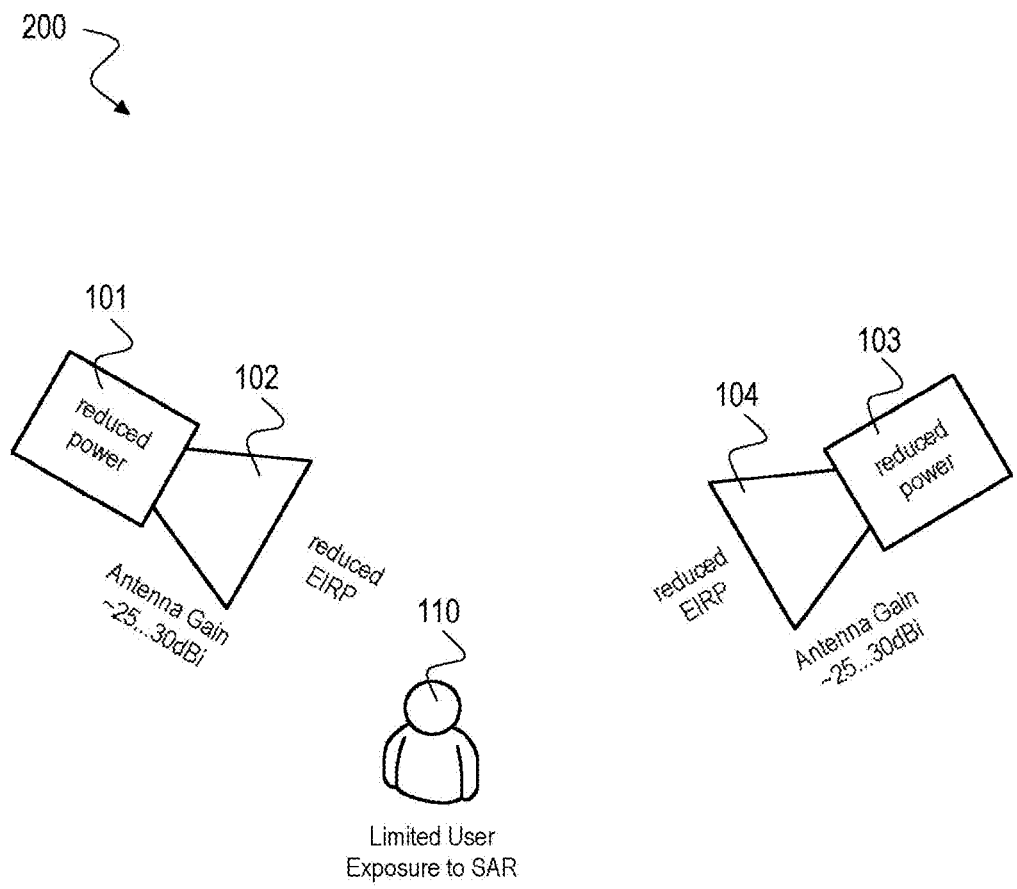
FIG. 2 is a schematic diagram of an exemplary millimeter wave radio transmission system 200 with an exemplary number of two mm wave transmitters 101, 103 transmitting at reduced power and the user 110 exposed to radiation power of the two transmitters 101, 103.

FIG. 2 is a schematic diagram of an exemplary millimeter wave radio transmission system 200 with an exemplary number of two mm wave transmitters 101, 103 transmitting at reduced power and the user 110 exposed to radiation power of the two transmitters 101, 103.

The system 200 illustrates spatial distribution of transmission in order to reduce exposure levels of user 110 to electromagnetic energy in proximity to transmit antennas 102, 104. Multiple transmit stations 101, 103 are used instead of a single one in order to serve one or multiple users. An identical transmission may be initiated by two or more stations 101, 103 simultaneously, reducing the corresponding output power level such that i) the power level at the receiver remains unchanged and ii) users 110 near the TX antennas are exposed to reduced radiation levels. Slightly misaligned simultaneous transmissions are handled by the multi-path processing in the receiver which is inherently managed by OFDM systems thanks to the Cyclic Prefix. As long as a delay between two signals arriving from different transmitters is below the duration of the Cyclic Prefix, all signals can be considered in the processing and no signal losses occur. Thus, synchronization errors due to different path lengths can be compensated by the processing in the receiver due to the Cyclic Prefix configuration of OFDM systems.

The user 110 shown in FIGS. 1, 2 and the further Figures can be a passive user moving or standing within the antenna range of one or more of the transmitters 101, 103. Alternatively, the user 110 can be a communication participant using a communication terminal to receive RF signals transmitted by the transmitters 101, 103. Generally, the user 110 can be any object within an antenna coverage of the transmitters 101, 103, in particular any object sensitive to RF transmission.

The advantage of a millimeter wave radio transmission system 200 depicted in FIG. 2 is that the exposure of users to radiation in proximity to TX antennas is reduced for every given instant (and not only over an integrated time period).

In an exemplary implementation, the transmitters 101, 103 with corresponding antennas 102, 104 may be mm wave transmitters and mm wave antenna arrays or antenna arrangements which may be arranged in network equipment such as base stations within a distance of about 500 meters between two of those antennas 102, 104. Alternatively, the transmitters 101, 103 with corresponding antennas 102, 104 may be mounted in mobile terminals or access points or in any of the devices described above in the introductory section. The function of the transmitters 101, 103 with corresponding antennas 102, 104 is not limited to millimeter wave transmission, any other radio frequency transmission can be applied as well, e.g. as described above in the introductory section.

Note that a distance of the user 110 to the antennas 102, 104 may be different. This difference may be determined by the transmitters and depending on the respective differences, each transmitter may correspondingly reduce its power level.

The system 200 may be applied for mm Wave transmission, e.g. using a 28 GHz main band as currently standardized in US and Asia or a 26 GHz main band as in Europe (see introductory section above where the different systems currently under standardization are described). Alternatively, the system may be applied for WiGig transmission at a 60 GHz main band (see also introductory section above).

Figure 3:
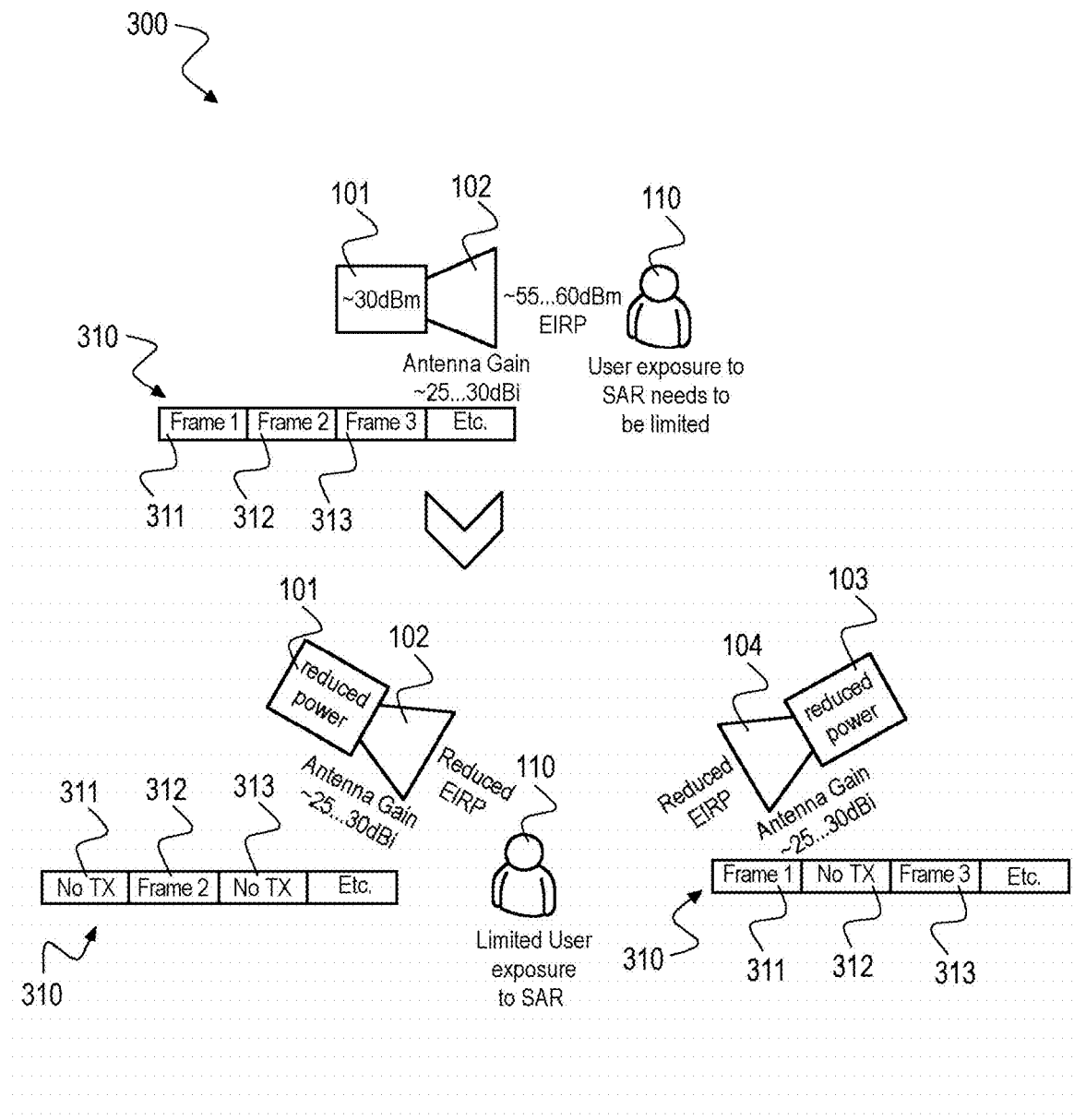
FIG. 3 is a schematic diagram of an exemplary millimeter wave radio transmission system 300 with an exemplary number of two mm wave transmitters 101, 103, which alternate in transmitting radio frames 311, 312, 313 of the radio frequency signal 310.

FIG. 3 is a schematic diagram of an exemplary millimeter wave radio transmission system 300 with an exemplary number of two mm wave transmitters 101, 103, which alternate in transmitting radio frames 311, 312, 313 of the radio frequency signal 310.

Instead of initiating multiple transmissions from a single station 101 as shown in the upper part of FIG. 3, the various transmissions are distributed to neighboring stations 101, 103 as shown in the lower part of FIG. 3. E.g., a first frame 311 is transmitted by transmitter 103 (of second station), a second frame 312 is subsequently transmitted by transmitter 101 (of a first station, a third frame 313 is subsequently transmitted by transmitter 103 (of second station), etc.

Note that there may be more than two stations. For example, in a system having an exemplary number of three stations, a first frame 311 may be transmitted by a first station, a second frame subsequently transmitted by a second station and a third frame subsequently transmitted by a third station, etc.

Such a millimeter wave radio transmission system 300 provides the advantage that the exposure of users to radiation in proximity to TX antennas can be reduced over an integrated time period (however not for a specific given instant).

In the original one-transmitter implementation as shown in the upper part of FIG. 3, exemplary transmitter output power levels of about 30 dBm are applied in combination with high gain antennas of about 25 to 30 dBi antenna gain. The resulting power levels are thus in the order of magnitude of about 55 to 60 dBm EIRP. Of course any other power levels can be applied for transmitter output as well as antenna gain (in all implementations of this disclosure).

In the two-transmitter implementation as shown in the lower part of FIG. 3, transmitter output power levels are reduced while antenna gain is unchanged at about 25 to 30 dBi. The resulting EIRP are reduced compared to the one-transmitter implementation. However, the antenna gains of the transmitters 101, 103 can be reduced as well. Possible implementations are: both antenna gains reduced, one antenna gain unchanged and second antenna gain reduced or even one antenna gain increased while second antenna gain reduced (stronger reduction than increase of other antenna gain).

Figure 4:
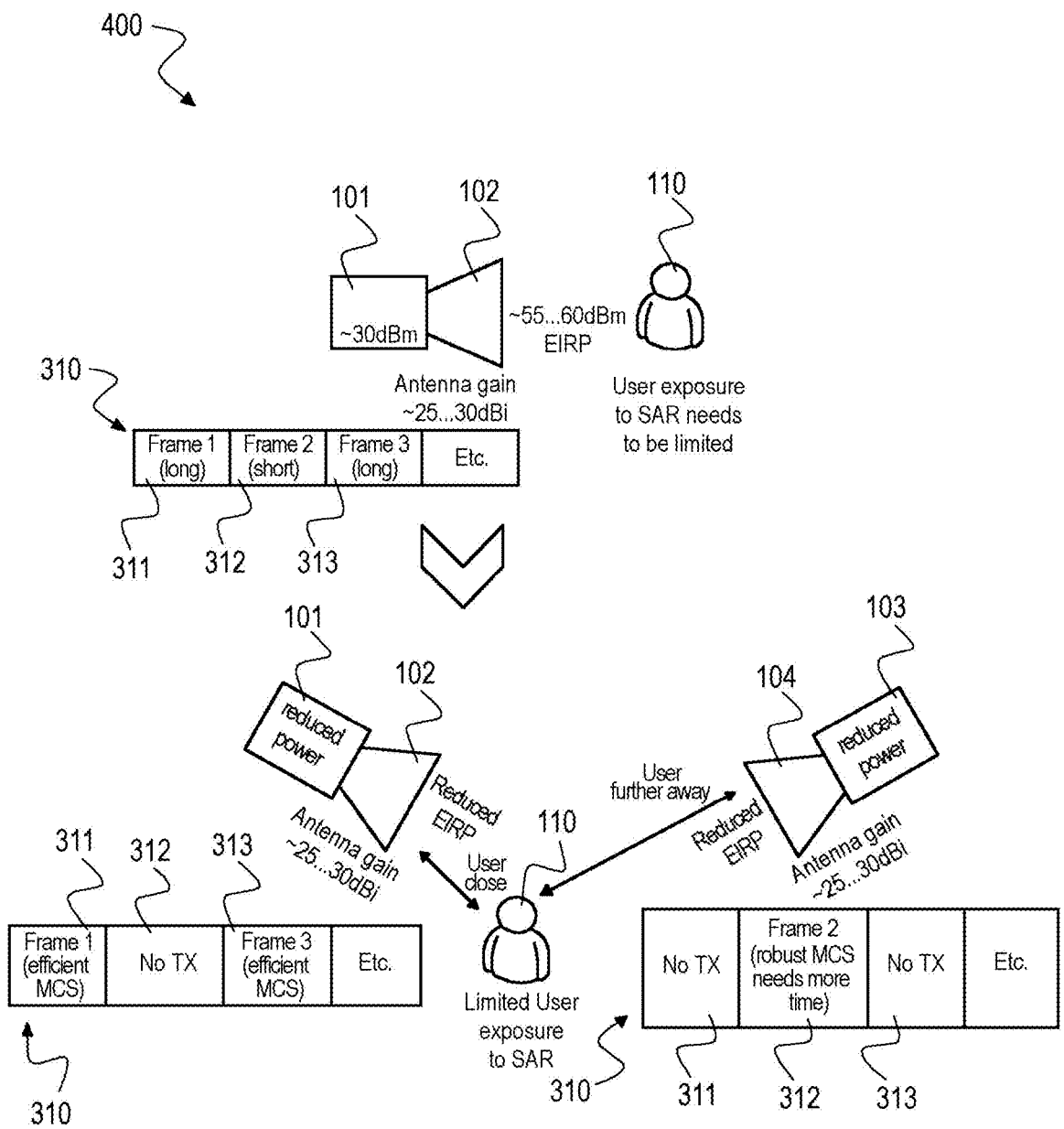
FIG. 4 is a schematic diagram of an exemplary millimeter wave radio transmission system 400 with an exemplary number of two mm wave transmitters 101, 103, which transmit radio frames 311, 312, 313 based on throughput requirements and distance to the user 110 (or object).

FIG. 4 is a schematic diagram of an exemplary millimeter wave radio transmission system 400 with an exemplary number of two mm wave transmitters 101, 103, which transmit radio frames 311, 312, 313 based on throughput requirements and distance to the user 110 (or object).

The configuration is similar to FIG. 3, but "long (or high throughput requirements)" transmissions and "short (or no high throughput requirements)" transmissions are differentiated in the configuration of FIG. 4. "long (or high throughput requirements)" transmissions are scheduled to be transmitted by stations in the proximity of the target user 110 (e.g. station 101 in lower part of FIG. 4) in order to maximize efficiency (typically, a highly spectrally efficient modulation and coding scheme can be used). For "short (or no high throughput requirements)" transmissions, a station further away from the user is chosen (e.g. station 103 in lower part of FIG. 4) and the MCS (Modulation and Coding Scheme) is chosen such that the transmission is sufficiently robust.

For example, a MCS may be chosen with a low constellation order such as BPSK, QPSK, etc. and a robust channel coding configuration is chosen.

High throughput requirements can be downloading a video stream or transmitting high priority data traffic or applications like Voice-over-IP that require low latency, while low throughput requirements can be downloading an email or an SMS or executing background tasks. Therefore, high throughput requirements transmissions should be performed by stations in the proximity of the target user 110 in order to maximize efficiency. However, as such high throughput requirements transmissions require high transmission power, they should be performed by stations further away from a passive user not involved in communications of the target user 110 and the radio transmitters in order to protect the passive user from high radiation.

Note: The examples above with respect to FIGS. 2 to 4 apply 2 transmit sites. In practice, any number of sites superior or equal to 2 can be used.

Figure 5:
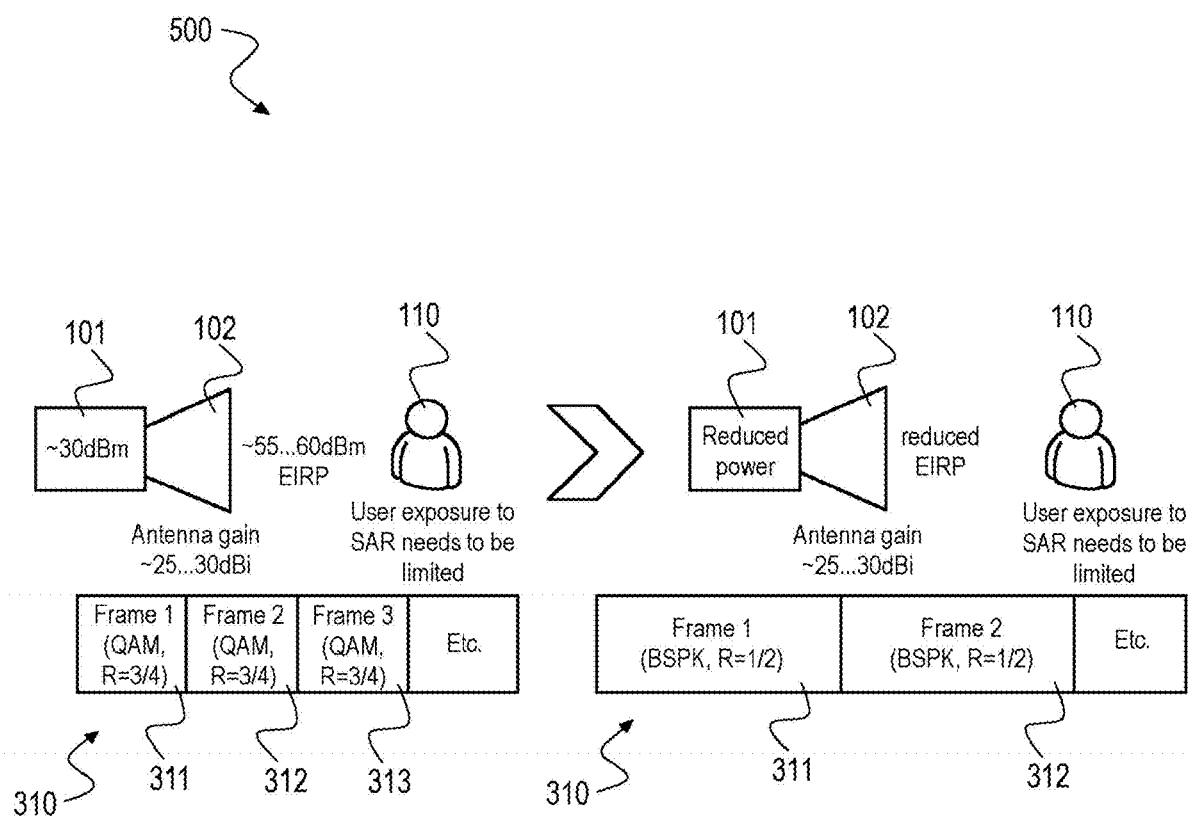
FIG. 5 is a schematic diagram of an exemplary millimeter wave radio transmission system 500 with a mm wave transmitter 101, which limits transmission power based on extending length of radio frames 311, 312.

FIG. 5 is a schematic diagram of an exemplary millimeter wave radio transmission system 500 with a mm wave transmitter 101, which limits transmission power based on extending length of radio frames 311, 312.

The system configuration exploits power reduction in combination with low-efficiency/low-power-requirement MCS mode and represents a simple further alternative of the configurations described above with respect to FIGS. 2 to 4. The duration of a transmission is extended through the selection of a highly robust (but less efficient) MCS mode (e.g., BPSK in combination with R=1/2 channel coding instead of QAM-16 (or higher) constellations in combination with R=3/4 or higher channel coding).

The original system configuration is shown on the left side of FIG. 5, where the RF signal 310 is partitioned into a plurality of radio frames 311, 312, 313, etc. The radio frames 311, 312, 313 may apply QAM and R=3/4 as MCS and channel coding. The adapted system configuration is shown on the right side of FIG. 5, where the duration of the radio frames 311, 312, 313, etc. is extended by applying BPSK (binary phase shift keying) and R=1/2 as MCS and channel coding. This results in reduced power of the radio transmitter 101 and reduced EIRP at antenna 102 output. Hence, user exposure to electromagnetic energy can be limited by reduced EIRP.

A code rate R=3/4 includes redundancy in the signal by extending 3 information bits to 4 information bits, thereby stabilizing the signal reception. However, a code rate R=1/2 includes more redundancy in the signal (than a code rate R=3/4) by extending 1 information bits to 2 information bits, thereby stabilizing the signal reception to a higher degree. A modulation and coding set using QAM (Quadrature Amplitude Modulation) provides a higher number of information (more constellation points) than a MCS using BPSK (having less constellation points). Hence, using BPSK usually extends the frame length but can reduce the power level of the signal. Note that these code rates and modulation and coding schemes are examples and any other code rates and MCS can be applied as well.

Figure 6:
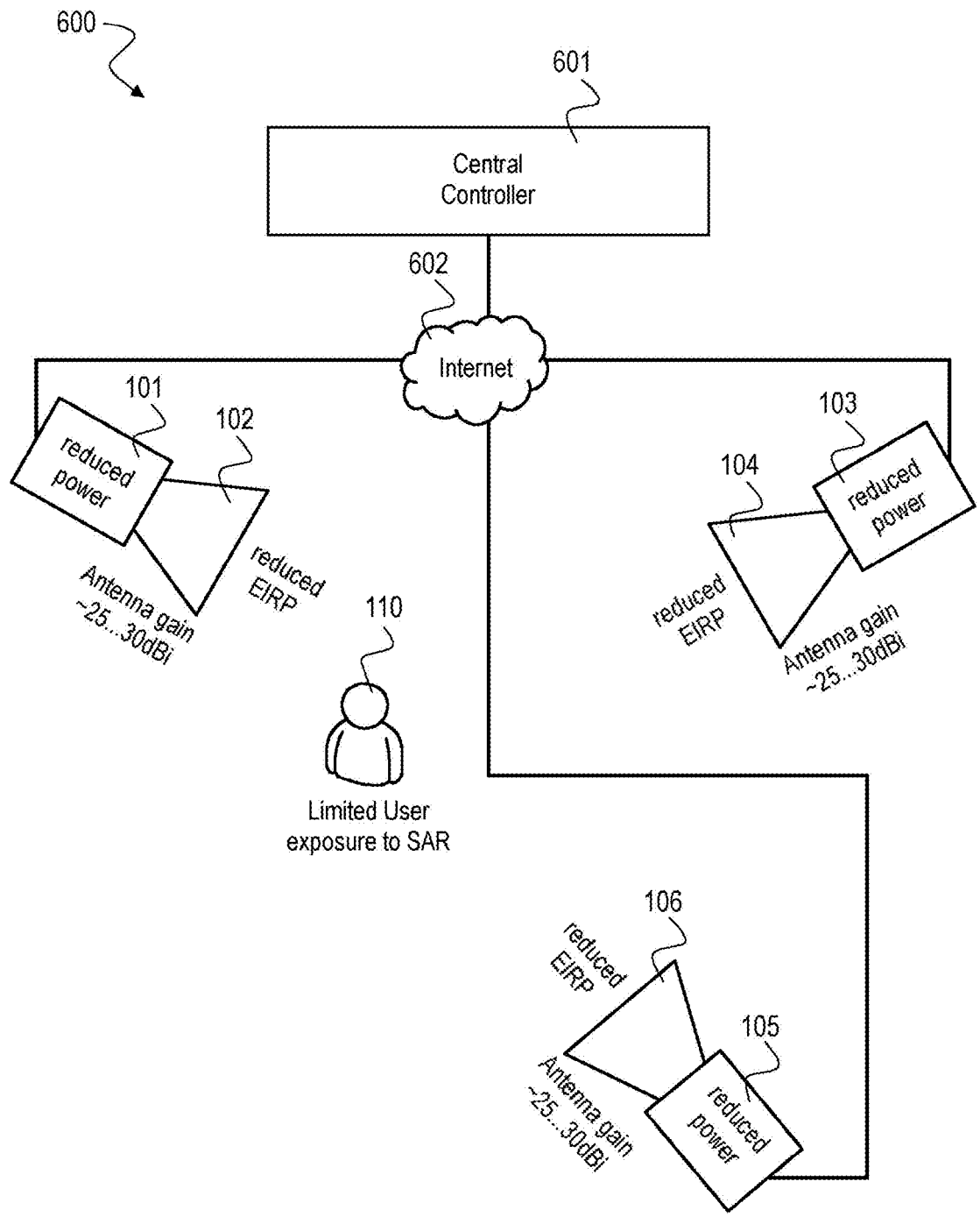
FIG. 6 is a schematic diagram of an exemplary millimeter wave radio transmission system 600 with an exemplary number of three mm wave transmitters 101, 103, 105 and a central controller 601.

FIG. 6 is a schematic diagram of an exemplary millimeter wave radio transmission system 600 with an exemplary number of three mm wave transmitters 101, 103, 105 and a central controller 601. The central controller may be The three mm wave transmitters 101, 103, 105 that are usually located within different geographic distances to the user 110 are controlled by the central controller 601, e.g. via Internet 602. The central controller may be implemented as a cloud service or alternatively as a service implemented within one of the stations (corresponding to transmitters 101, 103, 105).

The central controller 601 may be used for controlling transmission of a plurality of RF transmitters, e.g. transmitters 101, 103, 105 as shown in FIG. 6 or any other number of transmitters (not shown in FIG. 6).

The central controller may comprise a receiver configured to receive information about at least one object positioned within a proximity of the plurality of RF transmitters, e.g. the user 110 or any other object such as a passive user or a user not involved in communications with the transmitters, etc. The central controller may comprise a processor or a processing logic, e.g. implemented in hardware and/or software that is configured to control power levels of RF signals transmitted by the plurality of RF transmitters 101, 103, 105 based on the information about the at least one object 110.

Each RF transmitter 101, 103, 105 may be configured to transmit the same RF signal which is partitioned into a plurality of radio frames, e.g. as shown above with respect to FIGS. 3 to 5. The processor may be configured to control power levels of the RF signals based on coordinating which radio frames 311, 312, 313 of the RF signal 310 to transmit by which RF transmitter 101, 103, 105.

The processor may be configured to select a Modulation and Coding Scheme, MCS, and/or a channel coding configuration for the plurality of RF transmitters 101, 103, 105, e.g. as described above with respect to FIGS. 4 and 5, based on the information about the at least one object.

The central controller may be configured for adapting MCS mode selection, output power levels, number of sites to be involved in a transmission, etc. The central controller 601 may be implemented as a cloud service or as a service within the considered stations.

The central controller may be configured to implement the following process:

i. For an initial interaction between a User 110 and the mmWave station(s) 101, 103, 105, a low MCS mode may be selected (e.g., BPSK constellation and Rate R=1/2 channel coding, e.g. as described above with respect to FIG. 5) which requires only a low output power level.

ii. The communication conditions may be exchanged between a single mmWave station, e.g. station 101, and the User 110 (i.e. user terminal) applying the low MCS mode, i.e. indication of data length, required/desired throughput, latency, availability, mobility, etc.

iii. The Central controller 601 may process the information in order to select one of the modes introduced above (see FIGS. 2 to 5).

iv. Once the transmission is finalized, the connection is terminated.

Figure 7A:
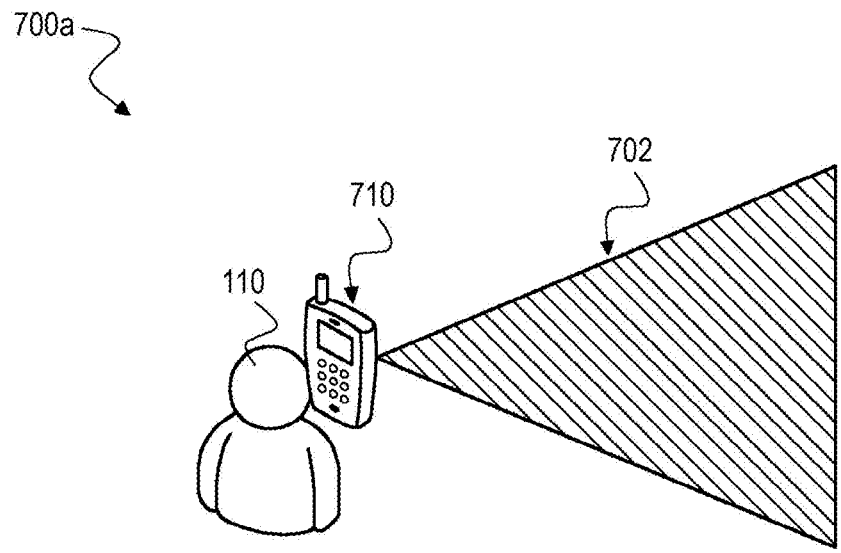
FIG. 7a is a schematic diagram of an exemplary millimeter wave radio transmission system 700a where a user 110 is outside of an antenna coverage 702 of a mobile device 710.

FIG. 7a is a schematic diagram of an exemplary millimeter wave radio transmission system 700a where a user 110 is outside of an antenna coverage 702 of a mobile device 710.

The antenna of a mobile device 710 is typically designed such that the energy is focused in the opposite direction of the user 110. The objective is to minimize the energy absorbed by the user 110. The user 110 depicted in FIG. 7a is the user involved in communication by using the mobile device 710. Although the user 110 is protected from radiation of his mobile device 710 another (passive) user 111 located beside the user but within the mobile device's antenna coverage 702 may suffer from high exposure to electromagnetic energy due to transmission power radiated by the antenna. This scenario is shown in FIG. 7b.

Figure 7B:
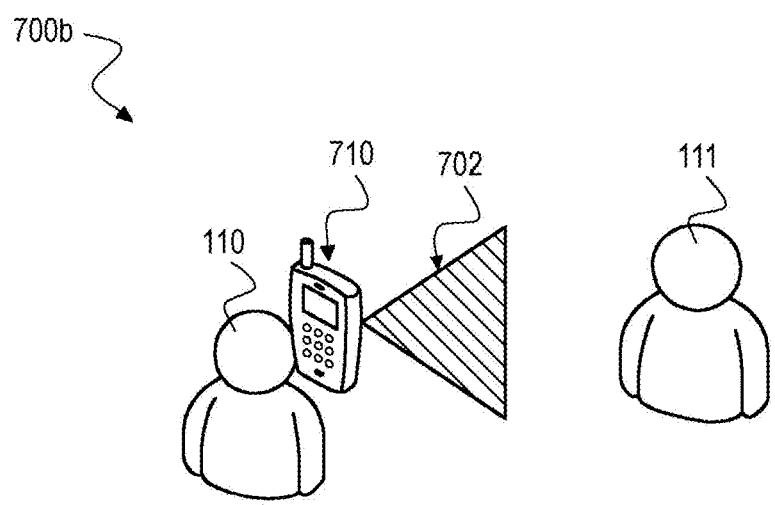
FIG. 7b is a schematic diagram of an exemplary millimeter wave radio transmission system 700b where a user 110 using the mobile device 710 is outside of the antenna coverage 702 of a mobile device 710 but a second user 711 is inside the antenna coverage 702.

FIG. 7b is a schematic diagram of an exemplary millimeter wave radio transmission system 700b where a user 110 using the mobile device 710 is outside of the antenna coverage 702 of a mobile device 710 but a second user 711 is inside the antenna coverage 702.

If another person 111 is nearby, e.g. a neighbor in public transportation, highly focused transmissions (such as mmWave transmissions) may cause relevant absorption of electromagnetic energy by the other person 111. In such a case, the presence of the other person 111 may be detected and the transmission configuration can be changed such that the other person 111 is protected. For example, the output power level of the mobile device 710 may be reduced.

Figure 7C:
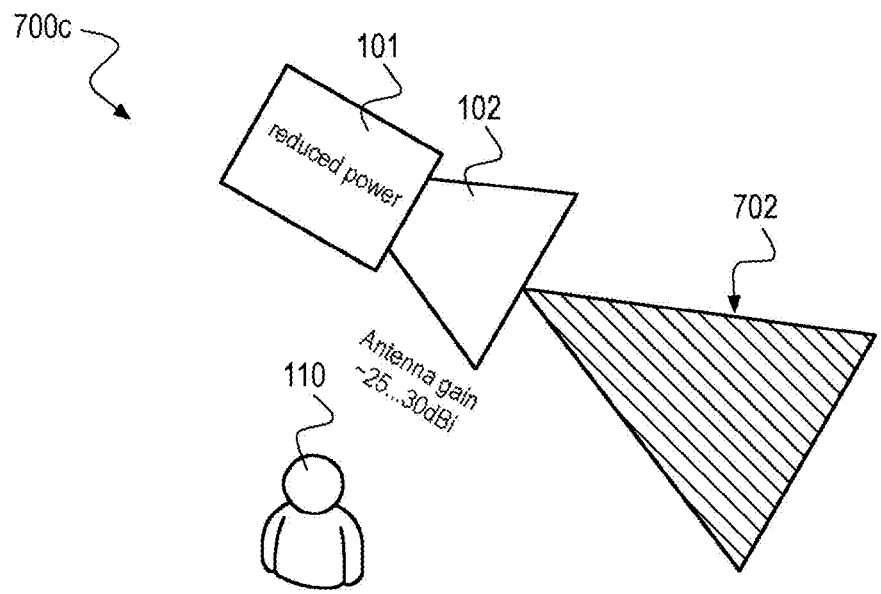
FIG. 7c is a schematic diagram of an exemplary millimeter wave radio transmission system 700c where a user 110 is not within the antenna coverage 702 of a mm wave transmitter 101.

FIG. 7c is a schematic diagram of an exemplary millimeter wave radio transmission system 700c where a user 110 is not within the antenna coverage 702 of a mm wave transmitter 101.

If the user 110 is not in direct emission of antenna (i.e. within antenna coverage 702), the transmitter 101 does not need to take specific precautions for protecting the user 110.

Figure 7D:
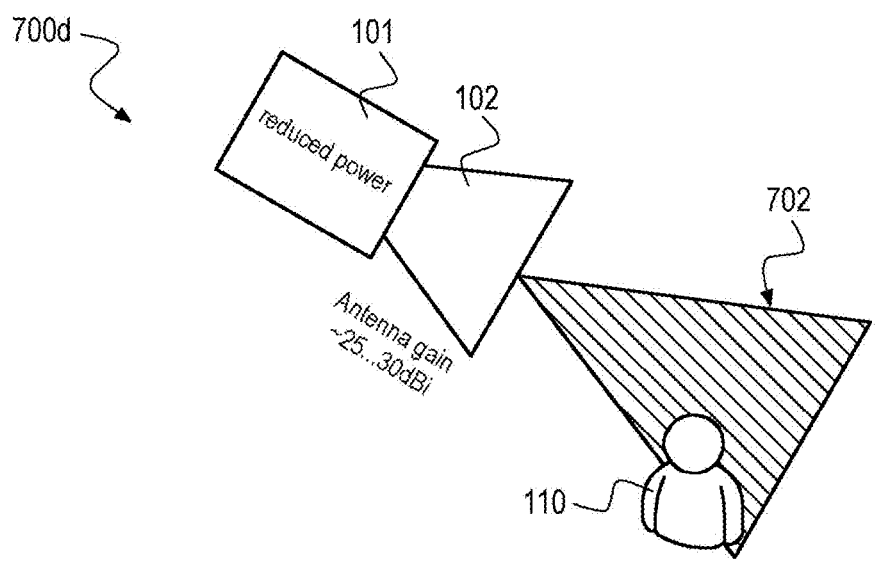
FIG. 7d is a schematic diagram of an exemplary millimeter wave radio transmission system 700d where a user 110 enters the direct emission antenna coverage area 702 of the mm wave transmitter 101.

FIG. 7d is a schematic diagram of an exemplary millimeter wave radio transmission system 700d where a user 110 enters the direct emission antenna coverage area 702 of the mm wave transmitter 101.

However, if the user 110 (or another user 111 as shown in FIG. 7b) enters the direct emission coverage area 702 of the transmitter 101 (of mobile device 710 as shown in FIGS. 7a and b), the transmitter 101 may need to take precautions in order to protect the user 110. E.g., upon detection of the user 110 entering the emission coverage area 702 in proximity to the antenna 102 (of mobile device 710), the transmission may be interrupted or alternatively the output power may be reduced or even switched off. When the User 110 has left the emission coverage area 702, these precautions are no longer required and normal operation can start again.

Figure 8:
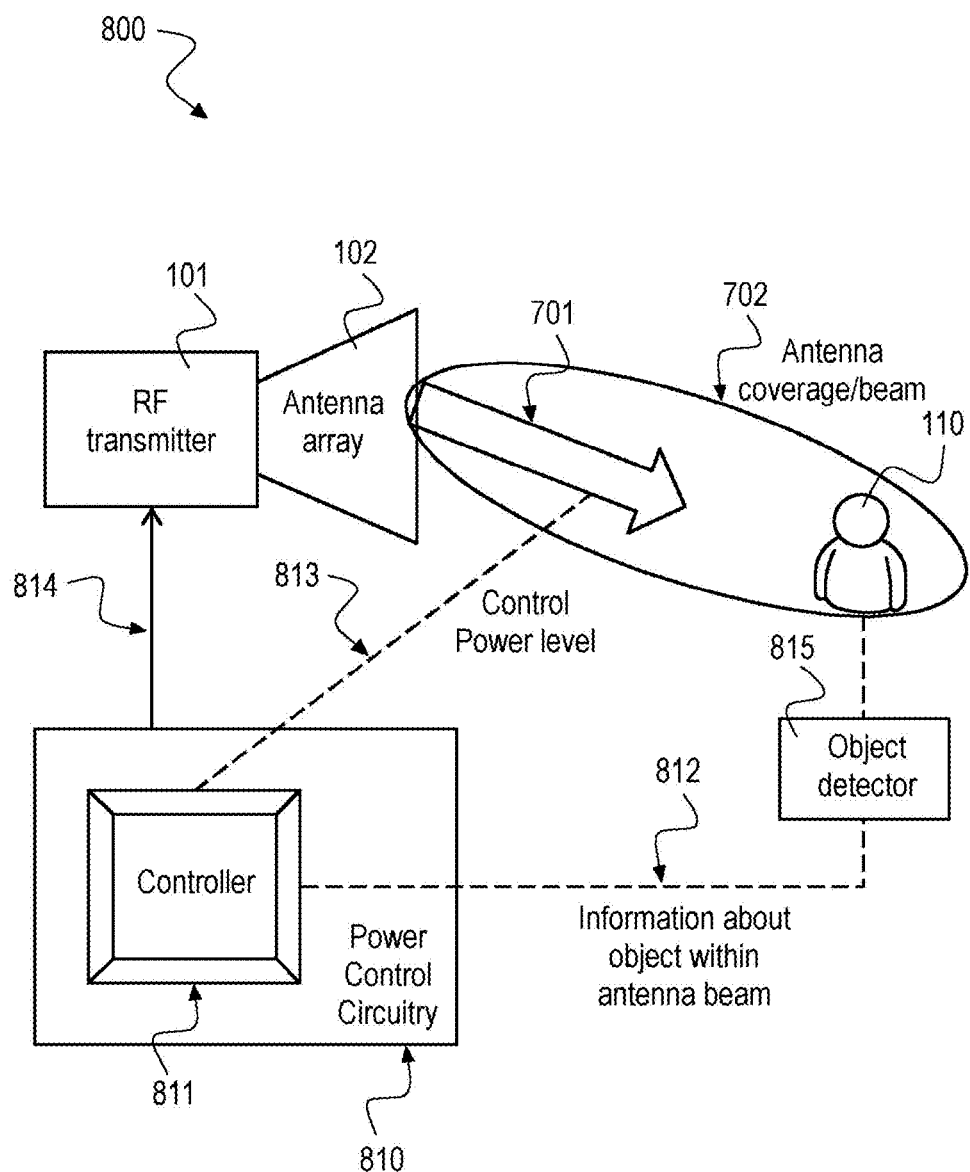
FIG. 8 is a schematic diagram of an exemplary radio frequency, e.g. millimeter wave transmission system 800 with an RF, e.g. millimeter wave, transmitter 101 controlled by a power control circuitry 810 according to the disclosure.

FIG. 8 is a schematic diagram of an exemplary radio frequency, e.g. millimeter wave transmission system 800 with an RF, e.g. millimeter wave, transmitter 101 controlled by a power control circuitry 810 according to the disclosure.

The system 800 includes an RF transmitter 101 generating an RF signal and an antenna arrangement 102 for radiating the RF signal at an adjustable power level 701. The system 800 further comprises a power control circuitry 810 for controlling the RF transmitter 101. The RF transmitter 101 may be arranged or mounted in a network equipment, e.g. an access point or base stations, etc., or a user equipment (not shown). The power control circuitry 810 comprises a controller 811 which is configured to control a power level 701 of the RF signal generated by the RF transmitter 101 for transmission via the antenna arrangement 102. An antenna arrangement is any arrangement of two or more antennas in one location (e.g. in a network equipment or user equipment) or distributed over multiple locations, e.g. distributed antenna locations, for example over multiple network equipment entities. An antenna array is also an antenna arrangement. The power level 701 is controlled 813 based on information 812 about an object 110 within a coverage area 702 (e.g. an antenna beam) of the antenna arrangement 102. The object 110 may be a user as described above with respect to FIGS. 1 to 7, e.g. a user involved in communication or a passive user not involved in communication. Particular, the object may be a human. The system may include an object detector 815 to detect the object 815 and provide the information 812 about the object to the power control circuitry 810. The system 800 may be configured as described above with respect to FIGS. 2 to 7.

The controller 811 may be configured to control a power level at an antenna port of the antenna arrangement 102 and/or an antenna gain of the antenna arrangement 102, e.g. as described above with respect to FIGS. 1 to 7.

The power control circuitry 810 may include an object detection circuitry configured to detect an object within the coverage area 702 of the antenna arrangement 102 and to provide the controller 811 with the information about the detected object 110. The object detection circuitry may either receive information from an external object detector 815 or may alternatively implement the object detector 815 functionality within the power control circuitry. For example sensors may be implemented at the antenna arrangement 102 and a detection circuitry may be implemented in the power control circuitry 810.

The object detection may be based on at least one of the following techniques: radar detection, lidar detection, video detection, infrared detection, motion detection, photo detection, acoustical detection, echo detection. The object detection may be further based on measuring reflections/scattering/etc. of any prior emitted electromagnetic energy (carrying data or not) or any other proximity detection technique etc. Also, the distance may be based on an exchange of information, such as location information, between neighboring devices, such as neighboring cellular phones, wifi devices, Bluetooth devices, WiGig devices, etc.

The controller 811 may be configured to control the power level 701 of the RF signal based on a distance of the object 110 to the antenna arrangement 102. The controller 811 may be configured to move the antenna pattern (e.g., direct the main beam to a different direction) such that the energy absorption of the concerned user is reduced. The controller 811 may be configured to: determine the distance of the object 110 to the antenna arrangement 102 based on the information 812 about the object 110, and turn off transmission of the RF signal upon determining the distance of the object 110 falling below a threshold. The controller 811 may be configured to turn on transmission of the RF signal upon determining the distance of the object 110 exceeding the threshold or exceeding another threshold than the above threshold for turn off.

The RF signal generated by the RF transmitter may comprise a millimeter wave signal or any other radio frequency signal as described above in the introductory section.

The controller 811 may be configured to reduce the power level 701 of the RF signal based on information about a cooperative transmission of the RF signal with at least one other RF transmitter 103, 105, e.g. as described above with respect to FIGS. 2 to 7.

The controller 811 may be configured to coordinate reduction of the power level 701 of the RF signal with the at least one other RF transmitter 103, 105 in order to keep a power level at a receiver of the cooperative transmission of the RF signal substantially unchanged.

The one or more other RF transmitters 103, 105 are in different geographical locations than the RF transmitter 101.

The RF signal 310 may be partitioned into a plurality of radio frames 311, 312, 313, e.g. as described above with respect to FIGS. 3 to 5. The controller 811 may be configured to reduce the power level 701 of the RF signal based on suppressing transmission of a subset of the radio frames of the RF signal 310, e.g. each second radio frame as shown in FIG. 4.

The controller 811 may coordinate with the at least one other RF transmitter 103, 105 which of the radio frames 311, 312, 313 of the RF signal 310 to transmit by the RF transmitter 101.

The controller 811 may coordinate with the at least one other RF transmitter 103, 105 which of the radio frames 311, 312, 313 to transmit based on throughput requirements of the radio frames, e.g. as described above with respect to FIG. 4.

The controller 811 may coordinate with the at least one other RF transmitters 103, 105 the throughput requirements of the radio frames 311, 312, 313 based on respective distances of the RF transmitter 101 and the other RF transmitters 103, 105 towards the object 110.

The controller 811 may coordinate with the at least one other RF transmitter 103, 105 to schedule a first radio frame for transmission by the RF transmitter 101 and to schedule a second radio frame having a lower throughput requirement than the first radio frame for transmission by the at least one other RF transmitter 103, 105 upon detection that the RF transmitter 101 is in closer proximity to the object than the at least one other RF transmitter 103, 105, e.g. as described above with respect to FIG. 4.

The controller 811 may schedule transmission of the first radio frame based on a higher Modulation and Coding Scheme, MCS, than a MCS of the second radio frame, e.g. as described above with respect to FIG. 5.

The controller 811 may schedule transmission of the first radio frame based on a less robust channel coding configuration than a channel coding configuration of the second radio frame, e.g. as described above with respect to FIG. 5.

The RF signal 310 may be partitioned into a plurality of radio frames 311, 312, 313 and the controller 811 may reduce the power level 701 of a radio frame transmission based on extending a duration of the radio frame transmission, e.g. as described above with respect to FIG. 5. The controller 811 may extend the duration of the radio frame transmission based on selection of a more robust MCS mode for the radio frame transmission, e.g. as described above with respect to FIG. 5.

The controller 811 may extend the duration of the radio frame transmission based on switching to a lower constellation and/or a lower channel coding for the radio frame transmission, e.g. as described above with respect to FIG. 5.

The controller 811 may receive the information about the cooperative transmission of the RF signal from a central controller 601, e.g. as described above with respect to FIG. 6. The central controller 601 may be implemented as a cloud service or a service within the network equipment or the user equipment of the RF transmitter or within network equipments or user equipments of the at least one other RF transmitters, e.g. as described above with respect to FIG. 6.

FIG. 8 also shows a radio transmitter device for use in a network equipment or a user equipment. The radio transmitter device comprises a Radio Frequency, RF, transmitter 101 configured to generate an RF signal for transmission via an antenna arrangement 102; and a controller 811 configured to control 813 a power level 701 of the RF signal based on information 812 about a cooperative transmission of the RF signal with at least one other RF transmitter 103, 105, e.g. as described above with respect to FIGS. 2 to 6.

The controller 811 is configured to coordinate reduction of the power level 701 of the RF signal with the at least one other RF transmitter 103, 105 in order to keep a power level at a receiver of the cooperative transmission of the RF signal substantially unchanged, e.g. as described above with respect to FIGS. 2 to 6.

Figure 9A:
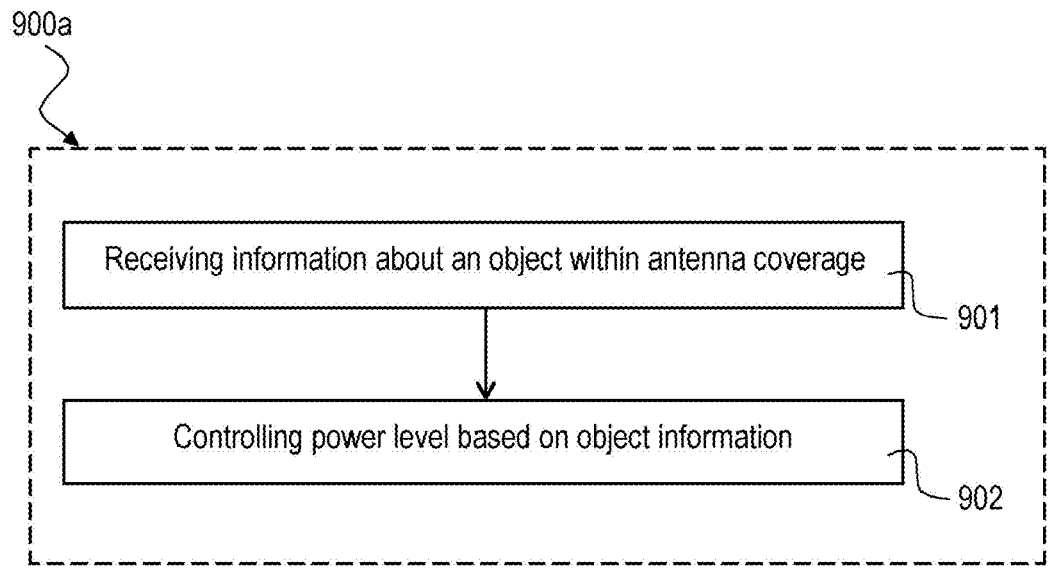
FIG. 9a is a schematic diagram of a first method 900a for controlling a power level of an RF signal transmitted by an RF transmitter according to the disclosure.

FIG. 9*a* is a schematic diagram of a first method 900*a* for controlling a power level of an RF signal transmitted by an RF transmitter according to the disclosure.

Such a first method 900a comprises: receiving 901 information 812 about an object 110 within a coverage area 702 of an antenna arrangement 102 of the RF transmitter 101, e.g. as described above with respect to FIG. 8; and controlling 902, 813 a power level 701 of the RF signal based on the information 812 about the object 110, e.g. as described above with respect to FIG. 8.

The first method 900a further comprises controlling at least one of: a power level at an antenna port of the antenna arrangement, an antenna gain of the antenna arrangement.

The first method 900a further comprises detecting an object within the coverage area of the antenna arrangement.

Figure 9B:
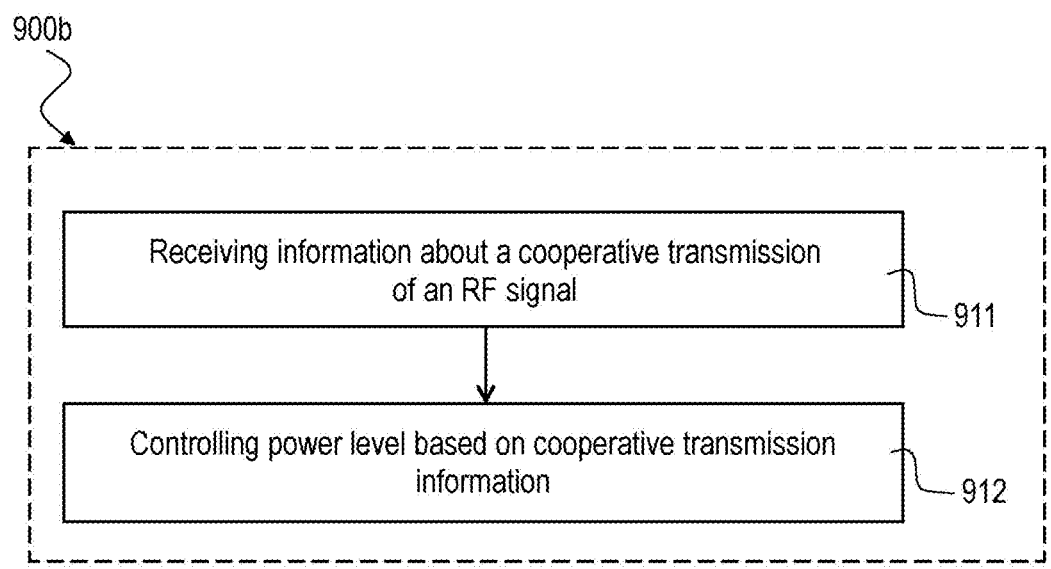
FIG. 9b is a schematic diagram of a second method 900b for controlling a power level of an RF signal transmitted by an RF transmitter according to the disclosure.

FIG. 9b is a schematic diagram of a second method 900b for controlling a power level of an RF signal transmitted by an RF transmitter according to the disclosure.

The second method 900b comprises receiving 911 information about a cooperative transmission of the RF signal with at least one other RF transmitter 103, 105, e.g. as described above with respect to FIGS. 2 to 6; and controlling 912 a power level 701 of the RF signal based on the information about the cooperative transmission.

The second method 900b further comprises coordinating reduction of the power level of the RF signal with the at least one other RF transmitter 103, 105 in order to keep a power level at a receiver of the cooperative transmission of the RF signal substantially unchanged.

The present disclosure also supports a computer program product including computer executable code or computer executable instructions that, when executed, causes at least one computer to execute the performing and computing blocks described herein, in particular the methods described above with respect to FIGS. 5 to 8 and 11 and the computing blocks described above with respect to FIGS. 2, 9 and 10. Such a computer program product may include a non-transient readable storage medium storing program code thereon for use by a processor, the program code comprising instructions for performing the methods or the computing blocks as described above.

EXAMPLES

The following examples pertain to further embodiments. Example 1 is a power control circuitry for controlling a radio frequency, RF, transmitter of a network equipment or a user equipment, the power control circuitry comprising a controller configured to control a power level of an RF signal generated by the RF transmitter for transmission via an antenna arrangement, wherein the power level is controlled based on information about an object within a coverage area of the antenna arrangement.

In Example 2, the subject matter of Example 1 can optionally include that the controller is configured to control at least one of: a power level at an antenna port of the antenna arrangement, an antenna gain of the antenna arrangement.

In Example 3, the subject matter of Example 1 or 2 can optionally include an object detection circuitry configured to detect an object within the coverage area of the antenna arrangement and to provide the controller with the information about the detected object.

In Example 4, the subject matter of Example 3 can optionally include that the object detection is based on at least one of the following: radar detection, lidar detection, video detection, infrared detection, motion detection, photo detection, acoustical detection, echo detection, measuring reflections and/or scattering of any prior emitted electromagnetic energy carrying data or not, proximity detection, exchange of location information between neighboring devices.

In Example 5, the subject matter of Example 1 or 2 can optionally include that the controller is configured to control the power level of the RF signal based on a distance of the object to the antenna arrangement and/or move an antenna pattern of the antenna arrangement to direct a main beam of the antenna arrangement to a different direction.

In Example 6, the subject matter of Example 5 can optionally include that the controller is configured to: determine the distance of the object to the antenna arrangement based on the information about the object, and turn off transmission of the RF signal upon determining the distance of the object falling below a threshold.

In Example 7, the subject matter of Example 6 can optionally include that the controller is configured to turn on transmission of the RF signal upon determining the distance of the object exceeding the threshold.

In Example 8, the subject matter of Example 1 or 2 can optionally include that the RF signal generated by the RF transmitter comprises a millimeter wave signal.

In Example 9, the subject matter of Example 1 or 2 can optionally include that the controller is configured to reduce the power level of the RF signal based on information about a cooperative transmission of the RF signal with at least one other RF transmitter.

In Example 10, the subject matter of Example 9 can optionally include that the controller is configured to coordinate reduction of the power level of the RF signal with the at least one other RF transmitter in order to keep a power level at a receiver of the cooperative transmission of the RF signal substantially unchanged.

In Example 11, the subject matter of Example 9 can optionally include that the at least one other RF transmitter is in a different geographical location than the RF transmitter.

In Example 12, the subject matter of Example 9 can optionally include that the RF signal is partitioned into a plurality of radio frames; and that the controller is configured to reduce the power level of the RF signal based on suppressing transmission of a subset of the radio frames of the RF signal.

In Example 13, the subject matter of Example 12 can optionally include that the controller is configured to coordinate with the at least one other RF transmitter which of the radio frames of the RF signal to transmit by the RF transmitter.

In Example 14, the subject matter of Example 13 can optionally include that the controller is configured to coordinate with the at least one other RF transmitter which of the radio frames to transmit based on throughput requirements of the radio frames.

In Example 15, the subject matter of Example 14 can optionally include that the controller is configured to coordinate with the at least one other RF transmitters the throughput requirements of the radio frames based on respective distances of the RF transmitter and the other RF transmitters towards the object.

In Example 16, the subject matter of Example 15 can optionally include that the controller is configured to coordinate with the at least one other RF transmitter to schedule a first radio frame for transmission by the RF transmitter and to schedule a second radio frame having a lower throughput requirement than the first radio frame for transmission by the at least one other RF transmitter upon detection that the RF transmitter is in closer proximity to the object than the at least one other RF transmitter.

In Example 17, the subject matter of Example 16 can optionally include that the controller is configured to schedule transmission of the first radio frame based on a higher Modulation and Coding Scheme, MCS, than a MCS of the second radio frame.

In Example 18, the subject matter of Example 16 can optionally include that the controller is configured to schedule transmission of the first radio frame based on a less robust channel coding configuration than a channel coding configuration of the second radio frame.

In Example 19, the subject matter of Example 9 can optionally include that the RF signal is partitioned into a plurality of radio frames; and that the controller is configured to reduce the power level of a radio frame transmission based on extending a duration of the radio frame transmission.

In Example 20, the subject matter of Example 19 can optionally include that the controller is configured to extend the duration of the radio frame transmission based on selection of a more robust MCS mode for the radio frame transmission.

In Example 21, the subject matter of Example 19 can optionally include that the controller is configured to extend the duration of the radio frame transmission based on switching to a lower constellation and/or a lower channel coding for the radio frame transmission.

In Example 22, the subject matter of Example 9 can optionally include that the controller is configured to receive the information about the cooperative transmission of the RF signal from a central controller.

In Example 23, the subject matter of Example 22 can optionally include that the central controller is implemented as a cloud service or a service within the network equipment or the user equipment of the RF transmitter or within network equipments or user equipments of the at least one other RF transmitters.

Example 24 is a central controller for controlling transmission of a plurality of radio frequency, RF, transmitters, the central controller comprising: a receiver configured to receive information about at least one object positioned within a proximity of the plurality of RF transmitters; and a processor configured to control power levels of RF signals transmitted by the plurality of RF transmitters based on the information about the at least one object.

In Example 25, the subject matter of Example 24 can optionally include that each RF transmitter is configured to transmit the same RF signal which is partitioned into a plurality of radio frames; and that the processor is configured to control power levels of the RF signals based on coordinating which radio frames of the RF signal to transmit by which RF transmitter.

In Example 26, the subject matter of Example 24 can optionally include that the processor is configured to select a Modulation and Coding Scheme, MCS, and/or a channel coding configuration for the plurality of RF transmitters based on the information about the at least one object.

Example 27 is a radio transmitter device for use in a network equipment or a user equipment, the radio transmitter device comprising: a Radio Frequency, RF, transmitter configured to generate an RF signal for transmission via an antenna arrangement; and a controller configured to control a power level of the RF signal based on information about a cooperative transmission of the RF signal with at least one other RF transmitter.

In Example 28, the subject matter of Example 27 can optionally include that the controller is configured to coordinate reduction of the power level of the RF signal with the at least one other RF transmitter in order to keep a power level at a receiver of the cooperative transmission of the RF signal substantially unchanged.

Example 29 is a method for controlling a power level of a radio frequency, RF, signal transmitted by an RF transmitter, the method comprising: receiving information about an object within a coverage area of an antenna arrangement of the RF transmitter; and controlling a power level of the RF signal based on the information about the object.

In Example 30, the subject matter of Example 29 can optionally include: controlling at least one of: a power level at an antenna port of the antenna arrangement, an antenna gain of the antenna arrangement.

In Example 31, the subject matter of Example 29 or 30 can optionally include: detecting an object within the coverage area of the antenna arrangement.

Example 32 is a method for controlling a power level of a radio frequency, RF, signal transmitted by an RF transmitter, the method comprising: receiving information about a cooperative transmission of the RF signal with at least one other RF transmitter; and controlling a power level of the transmitted RF signal based on the information about the cooperative transmission.

In Example 33, the subject matter of Example 32 can optionally include: coordinating reduction of the power level of the RF signal with the at least one other RF transmitter in order to keep a power level at a receiver of the cooperative transmission of the RF signal substantially unchanged.

Example 34 is a device for controlling a power level of a radio frequency, RF, signal transmitted by an RF transmitter, the device comprising: means for receiving information about an object within a coverage area of an antenna arrangement of the RF transmitter; and means for controlling a power level of the RF signal based on the information about the object.

In Example 35, the subject matter of Example 34 can optionally include: means for controlling at least one of: a power level at an antenna port of the antenna arrangement, an antenna gain of the antenna arrangement.

Example 36 is a power level control system, comprising a plurality of radio frequency, RF, transmitter devices, each RF transmitter device comprising: a Radio Frequency, RF, transmitter configured to generate an RF signal for transmission via an antenna arrangement; and a controller configured to control a power level of the RF signal based on information about a cooperative transmission of the RF signal with the other RF transmitter devices.

In Example 37, the subject matter of Example 36 can optionally include: a central controller configured to control the power levels of the RF signals of the plurality of RF transmitter devices.

In Example 38, the subject matter of Example 37 can optionally include that the central controller is configured to receive information about at least one object positioned within a proximity of the plurality of RF transmitter devices and to control the power levels of the RF signals of the plurality of RF transmitter devices based on the information about the at least one object.

Example 39 is a computer readable non-transitory medium on which computer instructions are stored which when executed by a computer cause the computer to perform the method of any one of Examples 29 to 33.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A power control circuitry for controlling a radio frequency, RF, transmitter of a network equipment or a user equipment, the power control circuitry comprising:
    a controller configured to control a power level of an RF signal generated by the RF transmitter for transmission via an antenna arrangement, wherein the power level is controlled based on information about an object within a coverage area of the antenna arrangement, the RF signal is partitioned into a plurality of radio frames, and the controller is configured to reduce the power level of the RF signal based on suppressing transmission of a subset of the radio frames of the RF signal.

2. The power control circuitry of claim 1, wherein the controller is configured to control at least one of:
    a power level at an antenna port of the antenna arrangement,
    an antenna gain of the antenna arrangement.

3. The power control circuitry of claim 1, comprising:
    an object detection circuitry configured to detect an object within the coverage area of the antenna arrangement and to provide the controller with the information about the detected object.

4. The power control circuitry of claim 3,
    wherein the object detection is based on at least one of the following:
        radar detection,
        lidar detection,
        video detection,
        infrared detection,
        motion detection,
        photo detection,
        acoustical detection,
        echo detection,
        measuring reflections and/or scattering of any prior emitted electromagnetic energy carrying data or not,
        proximity detection,
        exchange of location information between neighboring devices.

5. The power control circuitry of claim 1,
    wherein the controller is configured to control the power level of the RF signal based on a distance of the object to the antenna arrangement and/or to move an antenna pattern of the antenna arrangement to direct a main beam of the antenna arrangement to a different direction.

6. The power control circuitry of claim 5, wherein the controller is configured to:
    determine the distance of the object to the antenna arrangement based on the information about the object, and
    turn off transmission of the RF signal upon determining the distance of the object falling below a threshold.

7. The power control circuitry of claim 6, wherein the controller is configured to:
    turn on transmission of the RF signal upon determining the distance of the object exceeding the threshold.

8. The power control circuitry of claim 1,
    wherein the RF signal generated by the RF transmitter comprises a millimeter wave signal.

9. The power control circuitry of claim 1,
    wherein the controller is configured to reduce the power level of the RF signal based on information about a cooperative transmission of the RF signal with at least one other RF transmitter.

10. The power control circuitry of claim 9,
    wherein the controller is configured to coordinate reduction of the power level of the RF signal with the at least one other RF transmitter in order to keep a power level at a receiver of the cooperative transmission of the RF signal substantially unchanged.

11. The power control circuitry of claim 9,
    wherein the at least one other RF transmitter is in a different geographical location than the RF transmitter.

12. The power control circuitry of claim 1,
    wherein the controller is configured to coordinate with the at least one other RF transmitter which of the radio frames of the RF signal to transmit by the RF transmitter.

13. The power control circuitry of claim 12,
    wherein the controller is configured to coordinate with the at least one other RF transmitter which of the radio frames to transmit based on throughput requirements of the radio frames.

14. The power control circuitry of claim 13,
    wherein the controller is configured to coordinate with the at least one other RF transmitters the throughput requirements of the radio frames based on respective distances of the RF transmitter and the other RF transmitters towards the object.

15. The power control circuitry of claim 14,
    wherein the controller is configured to coordinate with the at least one other RF transmitter to schedule a first radio frame for transmission by the RF transmitter and to schedule a second radio frame having a lower throughput requirement than the first radio frame for transmission by the at least one other RF transmitter upon detection that the RF transmitter is in closer proximity to the object than the at least one other RF transmitter.

16. The power control circuitry of claim 15,
    wherein the controller is configured to schedule transmission of the first radio frame based on a higher Modulation and Coding Scheme, MCS, than a MCS of the second radio frame.

17. The power control circuitry of claim 15,
wherein the controller is configured to schedule transmission of the first radio frame based on a less robust channel coding configuration than a channel coding configuration of the second radio frame.

18. A central controller for controlling transmission of a plurality of radio frequency, RF, transmitters, the central controller comprising:
a receiver configured to receive information about at least one object positioned within a proximity of the plurality of RF transmitters;
a processor configured to control power levels of RF signals transmitted by the plurality of RF transmitters based on the information about the at least one object, wherein the processor is configured to control the power levels by partitioning at least one of the RF signals into a plurality of radio frames, and reducing the power level of the at least one of the RF signals based on suppressing transmission of a subset of the radio frames of the at least one of the RF signals.

19. The central controller of claim 18,
wherein each RF transmitter is configured to transmit the same RF signal which is partitioned into a plurality of radio frames; and
wherein the processor is configured to control power levels of the RF signals based on coordinating which radio frames of the RF signal to transmit by which RF transmitter.

20. The central controller of claim 18,
wherein the processor is configured to select a Modulation and Coding Scheme, MCS, and/or a channel coding configuration for the plurality of RF transmitters based on the information about the at least one object.

21. A method for controlling a power level of a radio frequency, RF, signal transmitted by an RF transmitter, the method comprising:
receiving information about an object within a coverage area of an antenna arrangement of the RF transmitter; and
controlling a power level of the RF signal based on the information about the object, wherein the controlling comprises:
partitioning the RF signal into a plurality of radio frames; and
reducing the power level of the RF signal based on suppressing transmission of a subset of the radio frames of the RF signal.

22. The method of claim 21, comprising:
controlling at least one of:
a power level at an antenna port of the antenna arrangement,
an antenna gain of the antenna arrangement.

23. The method of claim 21, comprising:
detecting an object within the coverage area of the antenna arrangement.

* * * * *